United States Patent
Han et al.

(10) Patent No.: US 9,821,862 B2
(45) Date of Patent: Nov. 21, 2017

(54) PLASMA ACTUATOR FOR VEHICLE AERODYNAMIC DRAG REDUCTION

(71) Applicant: GM Global Technology Operations LLC, Detroit, MI (US)

(72) Inventors: Taeyoung Han, Bloomfield Hills, MI (US); Bahram Khalighi, Birmingham, MI (US); Kuo-huey Chen, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/099,917

(22) Filed: Apr. 15, 2016

(65) Prior Publication Data

US 2017/0297634 A1    Oct. 19, 2017

(51) Int. Cl.
*B62D 35/00*      (2006.01)
*B62D 35/02*      (2006.01)
*H05H 1/24*       (2006.01)

(52) U.S. Cl.
CPC ............ *B62D 35/00* (2013.01); *B62D 35/02* (2013.01); *H05H 1/2406* (2013.01); *H05H 2001/2412* (2013.01)

(58) Field of Classification Search
CPC ...... B62D 35/00–35/02; H05H 1/2406; H05H 2001/2412
USPC ........................................... 296/180.1–180.5
See application file for complete search history.

(56) References Cited

U.S. PATENT DOCUMENTS

| | | | |
|---|---|---|---|
| 7,121,513 B2 * | 10/2006 | Leitner | E01B 7/14 246/276 |
| 7,380,756 B1 | 6/2008 | Enloe et al. | |
| 7,530,625 B2 * | 5/2009 | Gulker | B60R 1/06 296/1.11 |
| 7,624,941 B1 * | 12/2009 | Patel | B62D 35/007 244/200.1 |
| 7,735,910 B2 * | 6/2010 | Ramsay | B60J 7/22 180/903 |
| 7,954,768 B1 | 6/2011 | Patel et al. | |
| 8,016,246 B2 * | 9/2011 | Schwimley | B64C 21/00 244/1 N |
| 8,091,950 B2 * | 1/2012 | Corke | B62D 35/00 296/180.1 |
| 8,157,528 B1 * | 4/2012 | Khozikov | B64C 23/065 416/146 R |

(Continued)

FOREIGN PATENT DOCUMENTS

| | | | | |
|---|---|---|---|---|
| JP | 2010119946 | * | 6/2010 | ............. B62D 35/00 |
| JP | 2012210945 | * | 11/2012 | ............. B62D 35/00 |

*Primary Examiner* — Gregory Blankenship
(74) *Attorney, Agent, or Firm* — Mickki D. Murray; Parks IP Law LLC

(57) ABSTRACT

A plasma actuator includes a first electrode disposed on a substrate, covered by a dielectric layer, and a second electrode disposed on the dielectric layer. In operation, the plasma actuator creates a plasma region, altering air flowing over the actuator. The plasma actuator in various embodiments: has no moving parts, helps to improve fuel economy by reducing aerodynamic drag, improves vehicle stability control under severe unsteady flow environments, reduces wind noise around a vehicle on which the actuator is used, and reduces emission and CO2 foot print through the fuel economy improvement.

20 Claims, 7 Drawing Sheets

(56) References Cited

U.S. PATENT DOCUMENTS

| | | | | |
|---|---|---|---|---|
| 8,196,871 B2* | 6/2012 | Murray | ..................... | F01D 5/16 244/204 |
| 8,220,753 B2* | 7/2012 | Silkey | ................... | B64C 23/005 244/204.1 |
| 8,267,355 B1 | 9/2012 | Patel et al. | | |
| 8,308,112 B2* | 11/2012 | Wood | ................... | B64C 23/005 244/203 |
| 8,453,457 B2* | 6/2013 | Ginn | ....................... | F02K 1/386 239/265.19 |
| 8,523,115 B2* | 9/2013 | Essenhigh | ............ | B64C 23/005 244/205 |
| 8,640,995 B2* | 2/2014 | Corke | ................... | B64C 23/005 244/205 |
| 8,641,127 B2* | 2/2014 | Ramsay | ................. | B62D 35/00 296/180.1 |
| 9,067,674 B2* | 6/2015 | Nordin | ................. | B64C 23/005 |
| 9,446,840 B2* | 9/2016 | Drouin, Jr. | ............ | B64C 23/005 |
| 2004/0195462 A1* | 10/2004 | Malmuth | ................ | B64C 21/00 244/205 |
| 2006/0131282 A1* | 6/2006 | Miller | ................... | B64C 23/005 219/121.5 |
| 2007/0040726 A1* | 2/2007 | Kremeyer | ............... | B64C 23/04 342/52 |
| 2007/0089795 A1* | 4/2007 | Jacob | ................... | B64C 23/005 137/827 |
| 2008/0122252 A1* | 5/2008 | Corke | ................... | B64C 23/005 296/180.2 |
| 2010/0072777 A1* | 3/2010 | Ramsay | ................. | B62D 35/00 296/180.1 |
| 2010/0072778 A1* | 3/2010 | Ramsay | ................. | B62D 35/00 296/180.1 |
| 2012/0152198 A1* | 6/2012 | Kim | ....................... | B62D 35/00 123/188.1 |

* cited by examiner

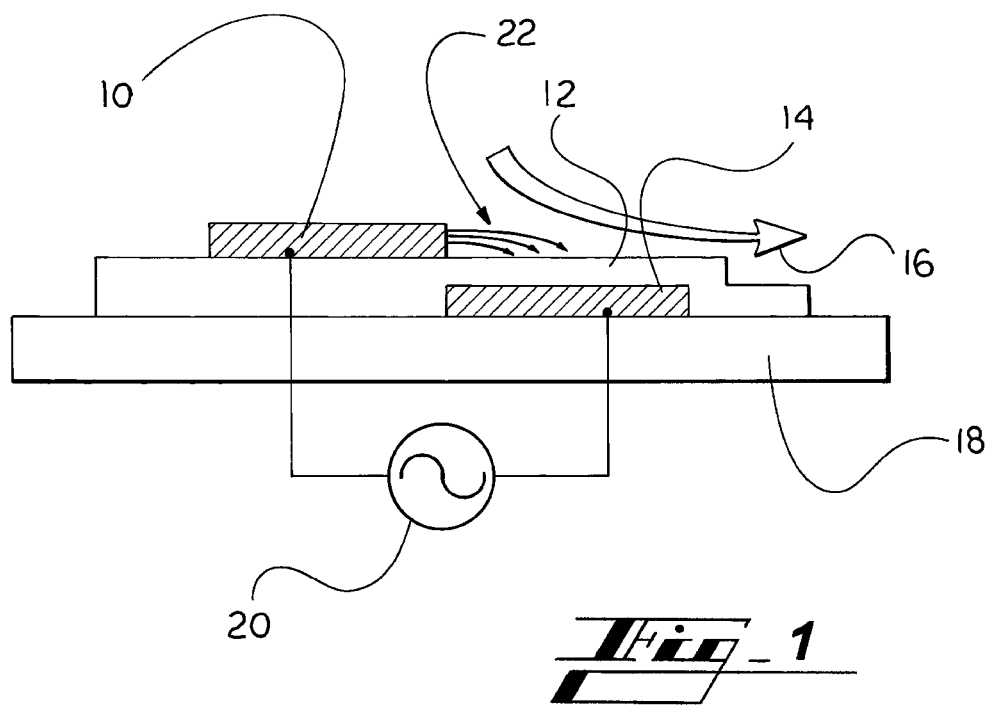
Fig_1
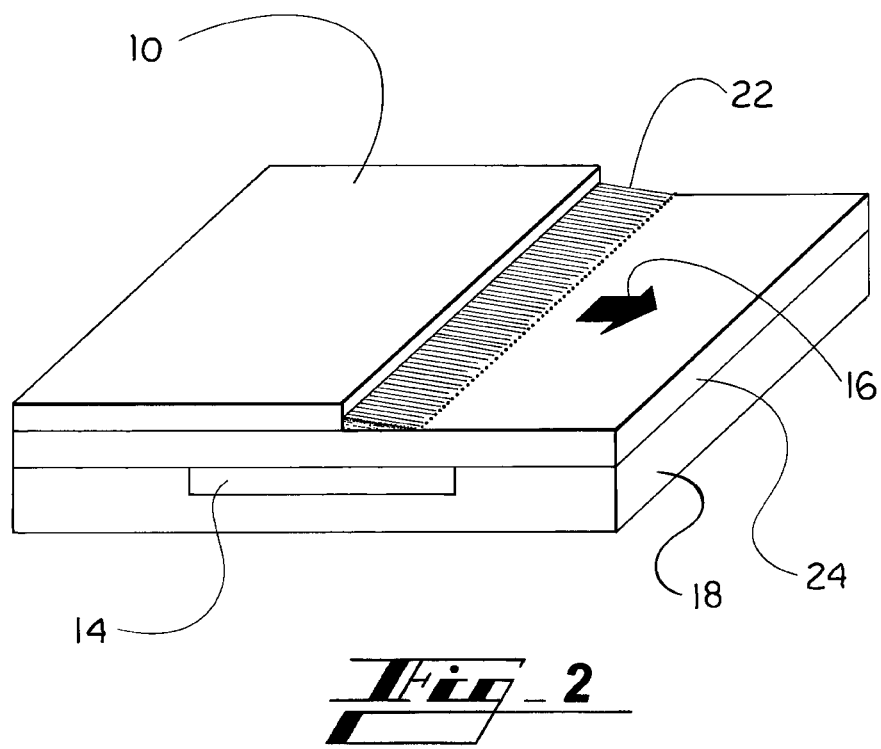
Fig_2

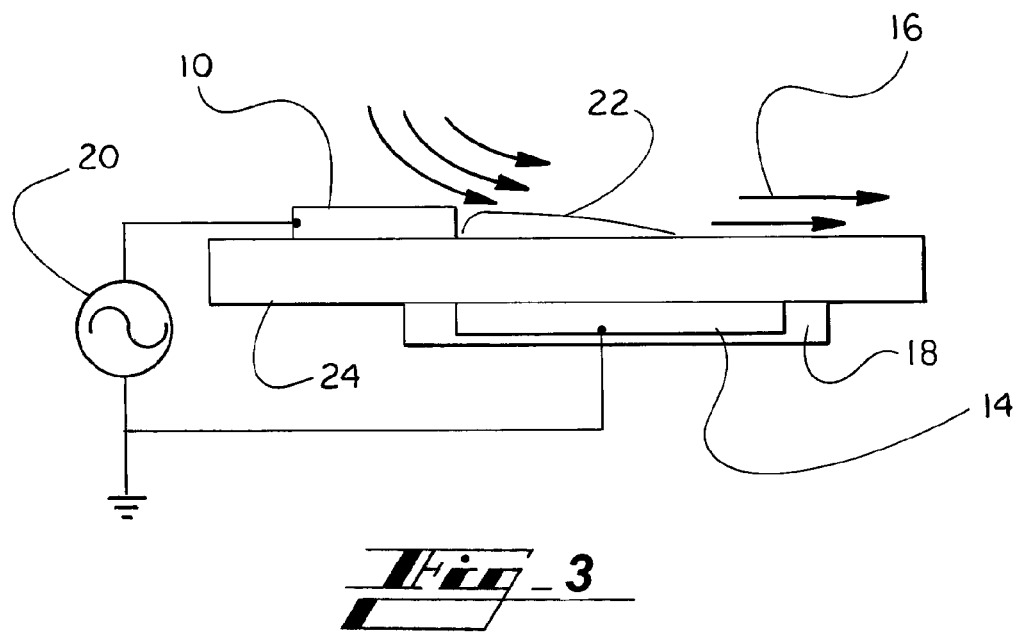
Fig_3
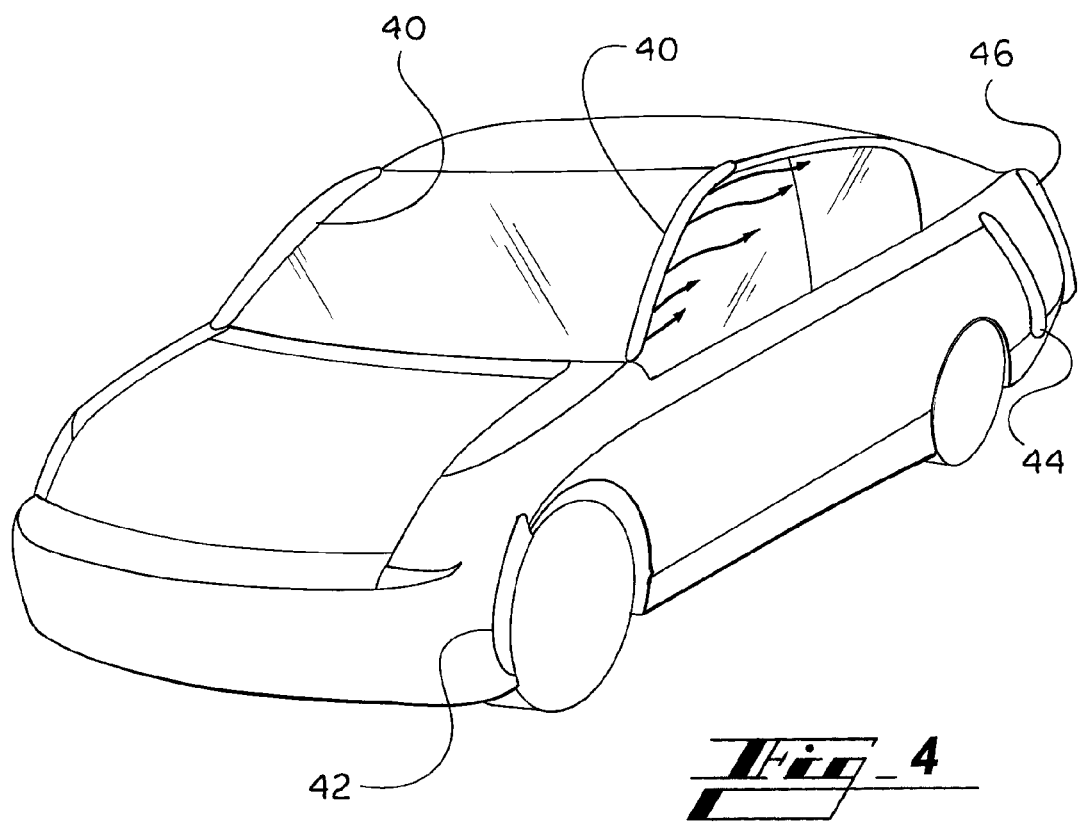
Fig_4

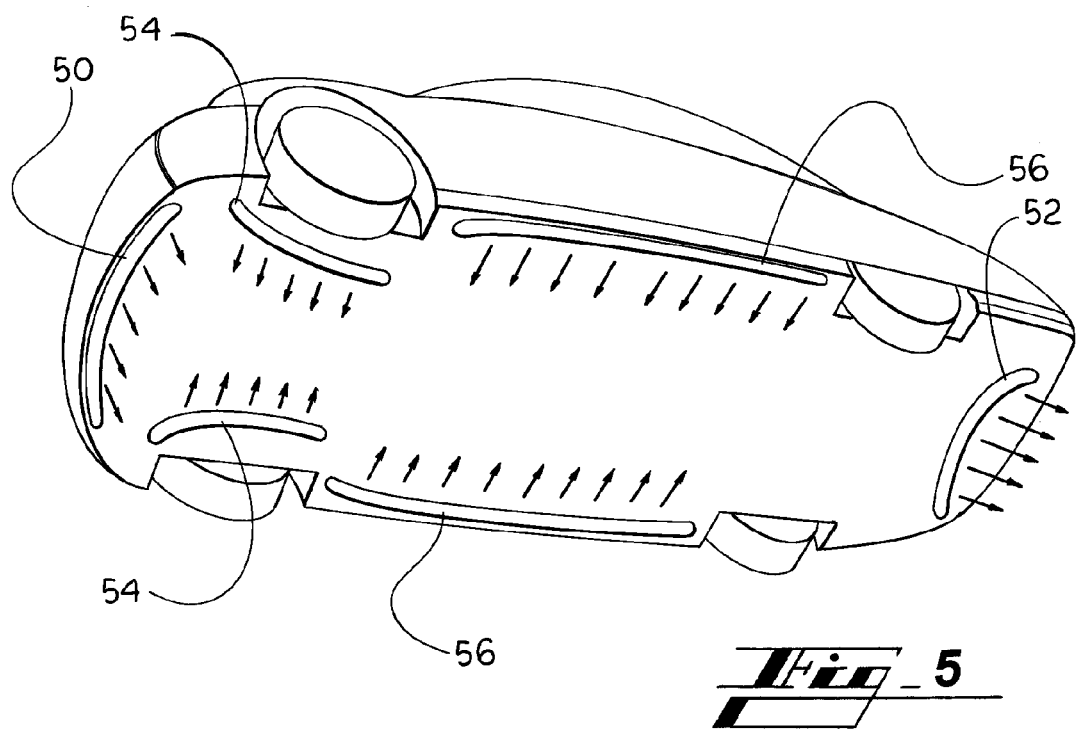
Fig_5
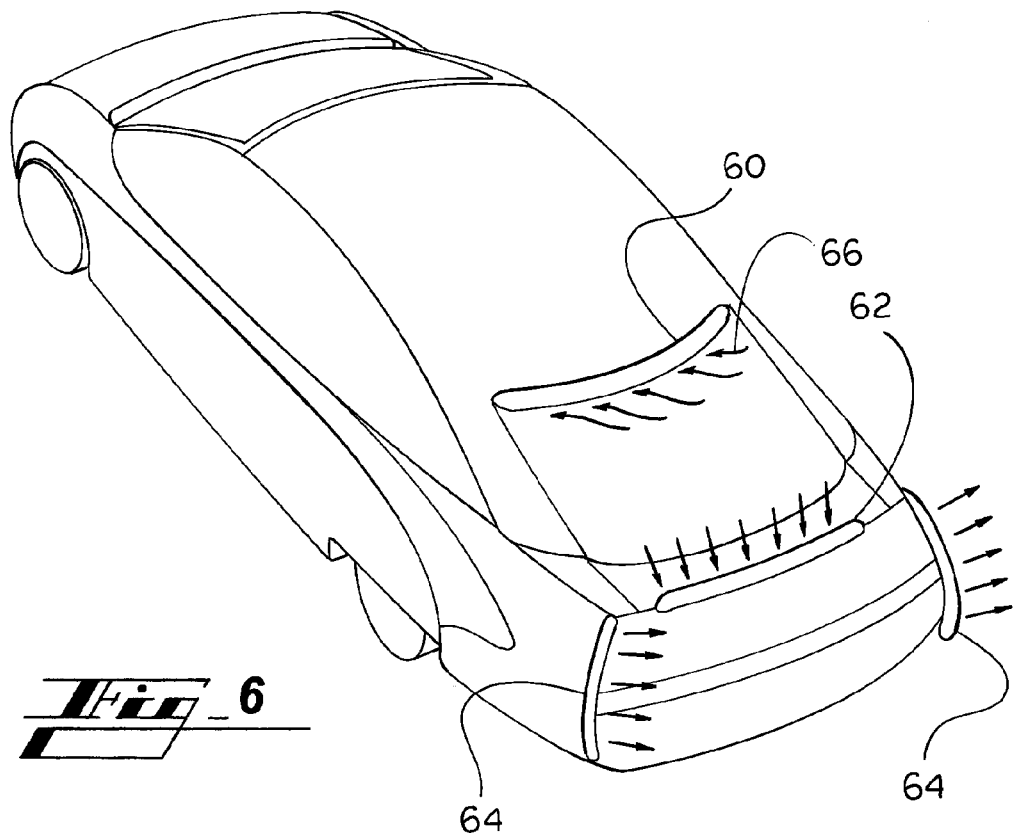
Fig_6

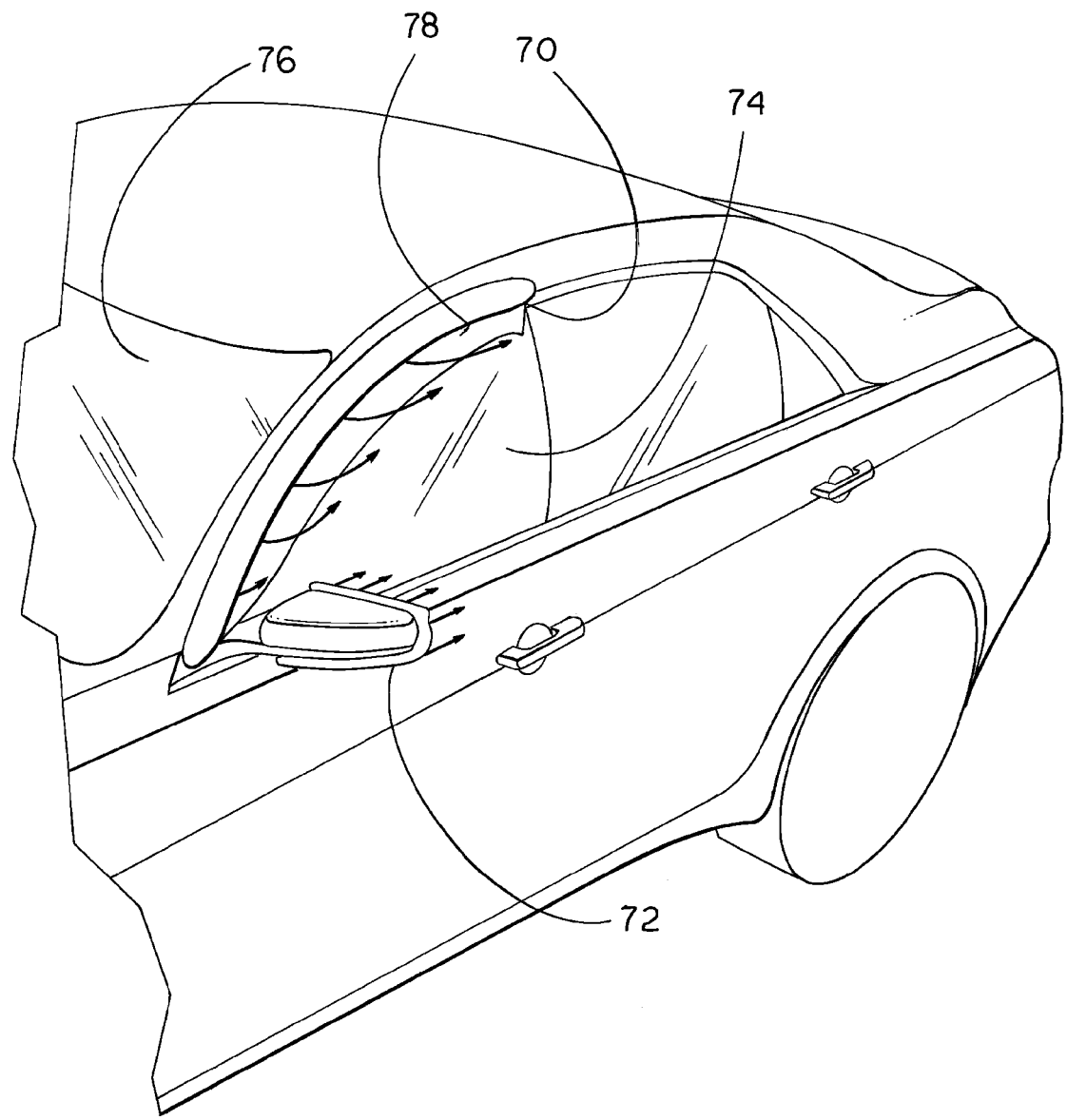
Fig_7

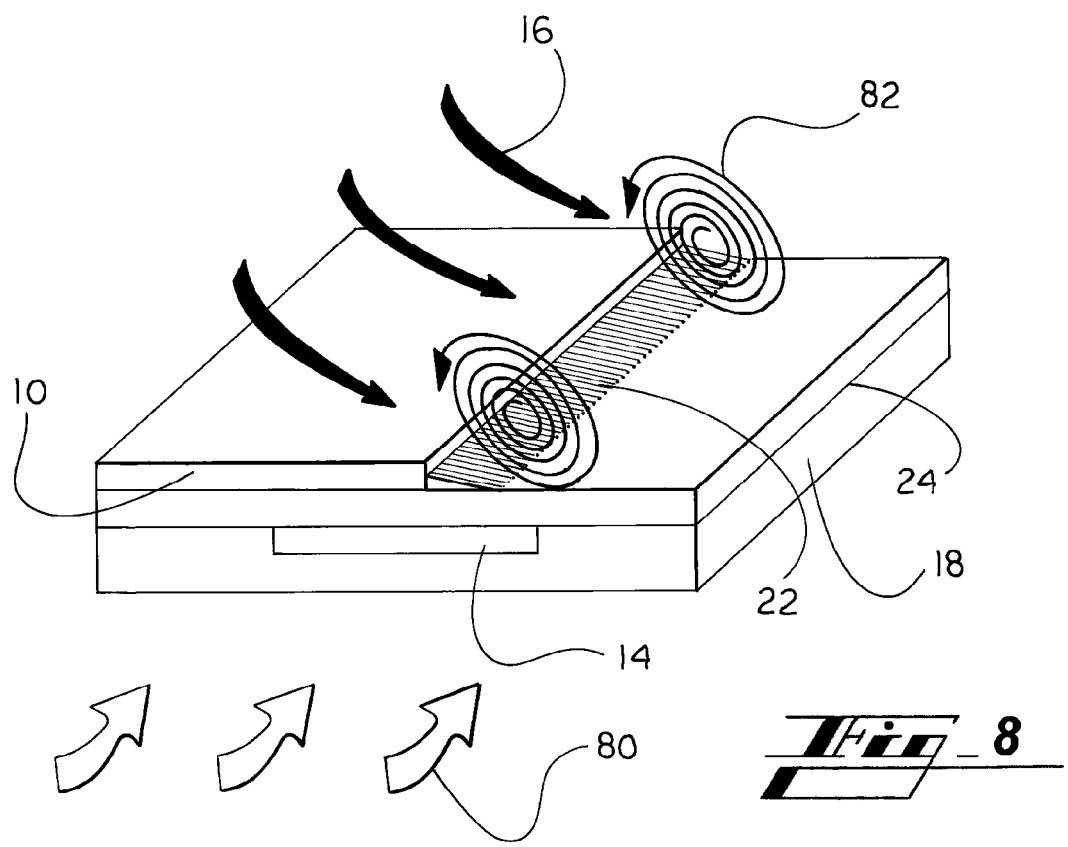
Fig_8
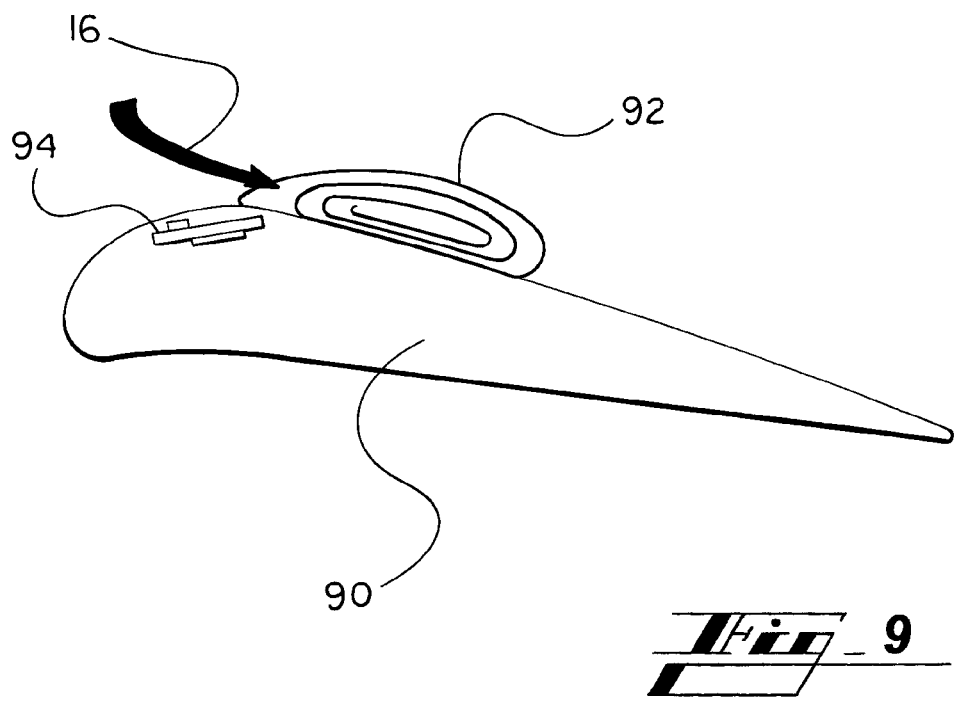
Fig_9

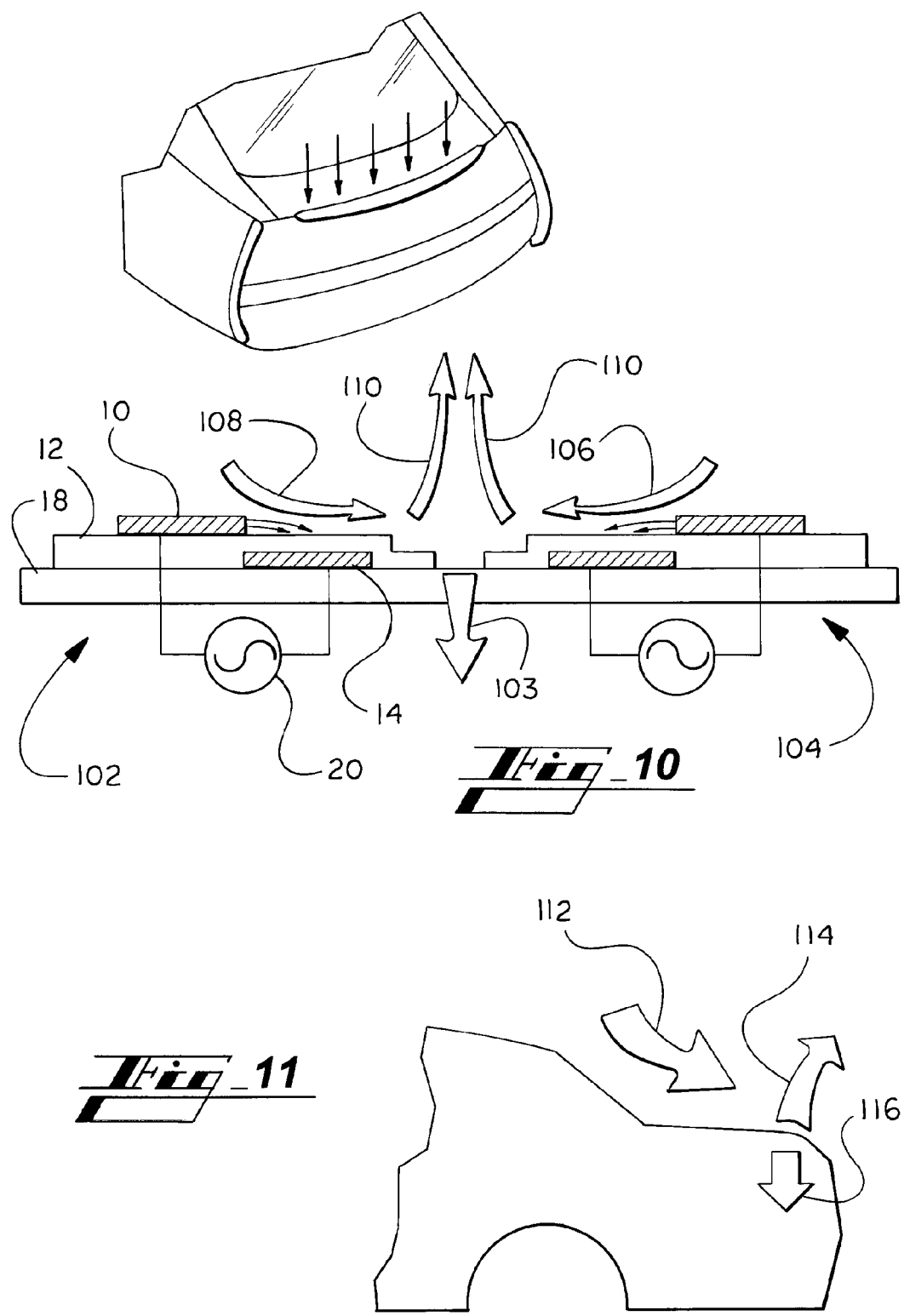

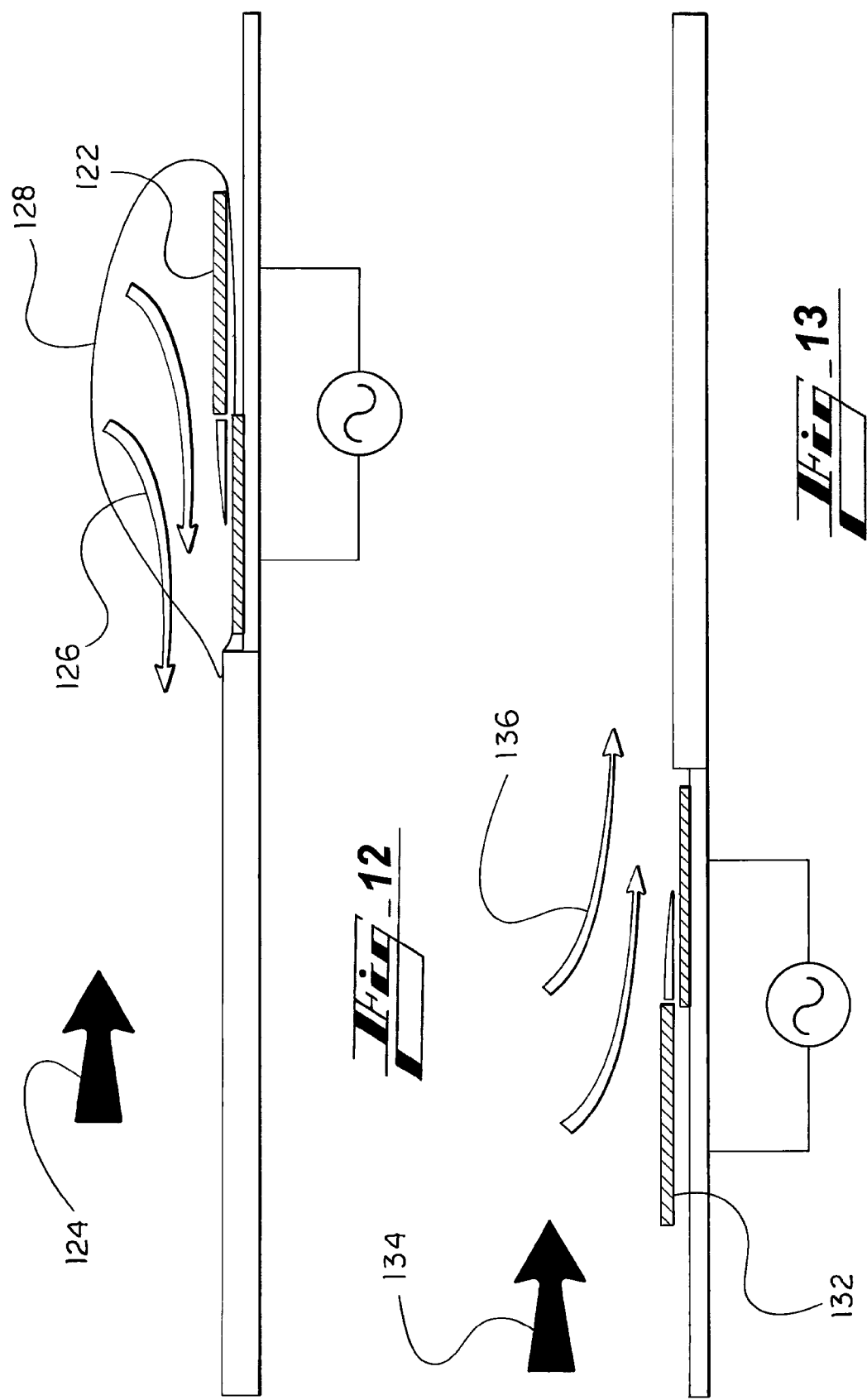

PLASMA ACTUATOR FOR VEHICLE AERODYNAMIC DRAG REDUCTION

FIELD OF THE PRESENT TECHNOLOGY

The present technology relates generally to transportation vehicles such as automobiles and, more specifically, to aerodynamic drag reduction for automobiles.

BACKGROUND OF THE PRESENT TECHNOLOGY

Fuel economy is one of the selling points for today's automobile market. Consumers want cars with improved fuel efficiency, so they can realize savings during their ownership of an automobile.

Fuel efficiency depends on several factors, such as engine design, body design, fuel quality, driving habits, etc. During the process of designing the body, or exterior shape of a car, many factors are considered, such as comfort, style, and utility. The exterior shape impacts how the car looks, and has a big effect on the aerodynamic drag effect, which affects fuel efficiency of the automobile.

The drag can be reduced by delaying or eliminating the flow separations on the automobile surface or controlling the flow separation at the rear end of automobiles. Such flow controls on the automobile surface require additional mechanical equipment to be installed in addition to modifications to the automobile body. The drag can also be reduced by modifying the exterior shape. However, the exterior shape cannot be changed substantially because it impacts the aesthetics of the car, which of course affects the desirability of the car by consumers.

The present technology is directed primarily to a system that reduces the drag and improves the fuel efficiency of automobiles without sacrificing aesthetics.

SUMMARY OF EMBODIMENTS OF THE TECHNOLOGY

The present technology includes a plasma actuator that, when activated, creates a plasma region, altering the flow of fluid around the plasma actuator. In one embodiment, the plasma actuator comprises a substrate, a first electrode disposed on the substrate, a dielectric layer disposed on the substrate and covering the first electrode, and a second electrode disposed on the dielectric layer.

In an alternative embodiment, the present disclosure describes an automobile having at least one plasma actuator disposed on or at an exterior surface of the automobile, wherein the plasma actuator comprises a substrate, a first electrode disposed on the substrate, a dielectric layer disposed on the substrate and covering the first electrode, and a second electrode disposed on the dielectric layer.

In another alternative embodiment, the present disclosure describes a plasma actuator comprising a substrate, a first electrode disposed on the substrate, a second electrode disposed on the substrate and separate from the first electrode, a first dielectric layer disposed on the substrate and covering the first electrode, a second dielectric layer disposed on the substrate and covering the second electrode, a third electrode disposed on the first dielectric layer, and a fourth electrode disposed on the second dielectric layer.

Further features and advantages of the technology, as well as the structure and operation of various embodiments of the technology, are described in detail below with reference to the accompanying drawings. It is noted that the technology is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form part of the specification, illustrate the present technology and, together with the description, further serve to explain the principles of the technology and to enable a person skilled in the relevant art(s) to make and use the technology.

FIG. 1 is a schematic diagram of a cross section view of a plasma actuator according to the present technology.

FIG. 2 is a perspective view of the schematic diagram of the plasma actuator of the present technology.

FIG. 3 is an alternative schematic diagram of a cross section view of the plasma actuator of the present technology.

FIG. 4 is an illustration of an automobile equipped with plasma actuators of the present technology.

FIG. 5 is another illustration showing placement of plasma actuators under the body of an automobile.

FIG. 6 is a third illustration showing placement of plasma actuators on an automobile.

FIG. 7 is a fourth illustration showing placement of plasma actuators on a side view mirror.

FIG. 8 illustrates use of a plasma actuator for boundary layer flow control.

FIG. 9 illustration an application of a plasma actuator.

FIG. 10 depicts control of down force through an embodiment of the present technology.

FIG. 11 illustrates the down force from the embodiment of FIG. 10.

FIG. 12 is an illustration of a flow control using the present technology.

FIG. 13 is another illustration of the flow control using the present technology.

DETAILED DESCRIPTION OF EMBODIMENTS OF THE TECHNOLOGY

While the present technology is described herein with illustrative embodiments for particular applications, it should be understood that the technology is not limited thereto. Those skilled in the art with access to the teachings provided herein will recognize additional modifications, applications, and embodiments within the scope thereof and additional fields in which the technology would be of significant utility.

While the technology is described primarily in connection with automobiles, the disclosure is not limited to automobiles. The descriptions below can be applied to other moving objects, such as aircraft, trucks, trailers, and trains, as just a few non-limiting examples.

The present disclosure describes a plasma actuator that reduces aerodynamic drag resulting from air flow. The reduction of aerodynamic drag is achieved by creating a plasma region that controls the flow separation around vehicle body surface. The plasma actuator of the present technology is made flush with any surface and is minimally invasive to a flow. The plasma actuator in various embodiments advantageously has no moving parts, and helps to improve fuel economy by reducing aerodynamic drag, improve vehicle stability control under severe unsteady flow environments, reduce wind noise around a vehicle, and reduce emission and CO2 foot print through the fuel economy improvement. By lacking moving parts, the plasma actuator is simpler to make and generally more robust, not being susceptible to component failure at or between movements.

Plasma actuators are used to add energy to low momentum boundary layers and, therefore, delay flow separation. Offsetting the placement of the electrodes allows the body force to influence the air velocity tangential to the surface. The body force vector can be controlled by the electrode arrangement and dielectric material. The actuator is typically constructed in an asymmetric configuration with an upper, exposed, electrode and a lower, covered, electrode separated by a dielectric material. Plasma actuators are compact, lightweight and offer substantial control authority by affecting local flow streamlines. Plasma actuators use the high voltage (for example, about 10 kVrms) with frequency range (for example, about 20 kHz) and demand a low current 0.2 A and relatively low power consumption. The plasma actuator response time is about a few milliseconds, which is much faster than the hydraulic mechanical actuators (more than 100 second) that are currently applied to performance vehicles.

FIG. 1 is a schematic diagram of a plasma actuator for reducing drag of fluid flow—e.g., air flow—according to the present technology. The plasma actuator has a first electrode 10, generally exposed to air flow 16, a second electrode 14 embedded in a dielectric layer 12, and the plasma actuator sits on a substrate 18. The second electrode 14 can extend to a bottom of the dielectric layer 12, and contact the substrate 18, as shown in FIG. 1. The substrate 18, and any other part or parts plasma actuator, can be flexible, such as for being shaped to match dimensions of a target automobile components, as referenced more below.

In various embodiments, a leading edge of the first electrode 10 is spaced (laterally in the view of FIG. 1) from a leading edge of the dielectric layer 12.

In various embodiments, a leading edge of the second electrode 14 is below or adjacent a trailing edge (in the direction of the air flow 16) of the first electrode 10, in a direction of the air flow 16 in operation. The electrodes are in some implementations positioned so that they at least partially overlap (in a vertical direction of the view of FIG. 1, and in others so that they do not overlap at all.

The first electrode 10 and the second electrode 14 are connected to a power source 20 via two separate connectors. While the power source 20 can be configured to deliver any of a wide variety of power outputs, in various embodiments, the power source 20 is capable of delivering 10 kVrms. The power source 20 may be a DC or AC source. The plasma actuators connected to pulsed DC sources are superior in performance that generate a larger body force at a much lower voltages compared to the AC plasma actuators. The power consumption of the pulsed DC plasma actuator with 40 inches long electrode is approximately 1 W which is about 100 times less than the AC plasma actuators. As the air 16 flows over the plasma actuator when the first electrode 10 and the second electrode 14 are energized by the power source 20, the air flow is ionized by the first electrode 10 and the second electrode 14, thus creating a plasma region 22, as shown in FIG. 2, extending from an edge of the first electrode 10. In an example, the thickness of the electrode, measured from the top to the bottom in FIG. 1, is about 0.1 mm approximately, the thickness of the dielectric layer, measured from the top to the bottom in FIG. 1, varies from about 0.1 mm to about 6 mm depending on the magnitude of the voltage of the power source. The dielectric layer is in various embodiments configured with a thickness sufficient to prevent a short between the two electrodes 10, 14. The width of the electrode, measured from one side to another side in FIG. 1, is about 25 mm.

FIG. 2 illustrates another embodiment of the present technology. In FIG. 2, the first electrode 10 overlaps the second electrode 14. The two electrodes may be separated as shown in FIG. 1 or overlapped as shown in FIG. 2. The second electrode 14 is disposed under the dielectric layer 24 and inside the substrate 18 and the plasma region 22 is formed in the direction of the air flow 16 from a trailing edge of the first electrode 10. In various embodiments, a leading edge of the first dielectric 10 can align with a front edge of the dielectric layer and/or the substrate, as shown in FIG. 2.

FIG. 3 illustrates yet another embodiment of the present technology. The first electrode 10 is disposed above a dielectric layer 24 and exposed to the air flow 16. The second electrode 14 is disposed at least partially within a substrate 18. The substrate 18 may be smaller than the dielectric layer 24. The first electrode 10 and the second electrode 14 are connected to the power source 20. Similar to what has been described for FIGS. 1 and 2, as the air 16 flows over the first electrode 10 and the electrodes are energized, the air is ionized and forms a plasma region 22 after of the trailing edge of the first electrode 10. The plasma injects energy into the boundary layer of the air flow, thus delaying the flow separation.

As shown, the novel plasma actuator is very effective in reducing drag though having a relatively simple construction. In various embodiments, the plasma actuator may be configured as a small strip, similar in thickness to a strip of aluminum foil, having or connected to a glue layer for easy attachment to an automobile body, and then connected to a power source. The thickness of the plasma actuator corresponds to the voltage of the power source—for instance, the plasma actuator is configured to have a thickness based on a known voltage, or the power source is configured or selected to deliver power having a voltage corresponding to a pre-determined plasma-actuator thickness. With relatively high voltage is required to generate the plasma, the voltage level and configuration of the plasma actuator should correspond to avoid damage from excess voltage to the plasma actuator and particularly its very thin electrodes.

The plasma actuator can be placed on different locations of an automobile body, preferably at or adjacent (fore or aft of) various edges around the automobile body where the boundary layer of the air flow tends to separate. FIG. 4 illustrates an automobile body with plasma actuators placed on different surfaces. As a first example, the plasma actuator can be placed on A-pillars 40 to reduce any vortex (reference numeral 82 in FIG. 8 as an example) generally present around the A-pillars 40. The plasma actuator can be positioned, more particularly, on or adjacent each A-pillar, such as by being positioned slightly fore or aft of the pillar. The plasma actuator can be configured to extend along any of various lengths of the pillar, including along substantially all, or an entirety, of the pillar, as shown in FIG. 4. The plasma actuator is in various embodiments curved and/or otherwise shaped to match dimensions of the pillar, and/or the plasma actuator comprises materials (some or all) sufficient to render the plasma actuator flexible enough to be shaped to (e.g., bend with bend of the pillar) for a flush fit.

A plasma actuator according to the present technology can be used at any of the vehicle pillars, such as at any one or more of the B-pillars and C-pillars.

A plasma actuator can also be placed around the front fender skirt 42 to control front tire flow separation and to reduce the front tire wake. The plasma actuator can be positioned at or adjacent the skirt, and along any length thereof. And again, the plasma actuator is in various embodiments curved and/or otherwise shaped to match dimensions of the skirt, and/or the plasma actuator comprises materials (some or all) sufficient to render the plasma actuator flexible enough to be shaped to (e.g., bend with a bend of the skirt) for a flush fit. The plasma actuator can be in such cases to be positioned around the corresponding vehicle component—e.g., around the skirt.

A plasma actuator can further be placed at or adjacent the rear fender 44 (e.g., a leading edge of the rear fender), and/or a plasma actuator can also be positioned at or adjacent the rear fender tail edge 46 to control separation of the rear flow boundary layer and the resulting wake region. Again, the plasma actuator can be positioned at or adjacent the rear fender or rear-fender tail edge, and along any lengths thereof. And again, the plasma actuator is in various embodiments curved and/or otherwise shaped to match dimensions of the fender or edge, and/or the plasma actuator comprises materials (some or all) sufficient to render the plasma actuator flexible enough to be shaped to the render or rear-fender tail edge (e.g., bend with a bend of the rear fender or rear-fender tail edge) for a flush fit. Plasma actuators can be in such cases to be positioned around the corresponding vehicle component—e.g., around the rear fender or the rear-fender tail edge.

The plasma actuator can be placed in many other places on the body of an automobile where air disturbance may be present. For example, FIG. 5 illustrates example locations on exposed vehicle surface(s) under the chassis of an automobile where the plasma actuator can be placed. The plasma actuator can be placed under the front air dam 50, around the underbody strakes 52, 54, 56. By placing the plasma actuators on these locations under the chassis, the air disturbance can be reduced and consequently the drag reduced.

FIG. 6 illustrates locations about a rear of an automobile where the plasma actuators can be placed. The actuators placed around the rear fender tail edge 64 can improve the vehicle aerodynamic stability under a gust or unsteady flow environments. The plasma actuator 60 placed on the edge of the roof top can also be used to trigger flow separation 66 of the air flow flowing around the car body, thus reducing the lift force and improving the side wind stability. By placing two opposing plasma actuators (FIG. 10) around the rear edge 62 of a trunk, or decklid, down force 116 can be produced near the end of the vehicle. The rear end down force helps to improve the vehicle stability under severe side wind conditions. The air flow 112 that passes over the two opposing plasma actuators 62 (also FIG. 10) on the edge of the decklid will interact with the upward flows 114, 110. The interaction between flows 112 and 114 will produce down forces 116, 103 as shown in FIGS. 10 and 11.

A plasma actuator of the present technology may have different construction that allows a better control of the induced air flow. FIG. 10 illustrates an alternative embodiment of a plasma actuator that is made from connecting two plasma actuators 102 and 104. Each of the plasma actuators 102 and 104 has a construction similar to that described in FIG. 1. In a contemplated embodiment, one or both plasma actuators are like that shown in FIG. 2. The plasma actuators 102 and 104 are opposed to each other, such as to mirror each other. The plasma actuators 102 and 104 can be disposed on a common substrate 18 and each plasma actuator is made from one exposed electrode 10 placed above a dielectric layer 12 with another electrode 14 embedded inside the dielectric layer 12 and a power source 20 connecting to both electrodes 10 and 14. Each plasma actuator alters the air flow flowing over the plasma actuator. Because two plasma actuators 102, 104 are disposed opposite of each other, the induced flows 106, 108 are opposite of each other, thus forcing an upward flow 110. This alternative embodiment of the plasma actuator, when placed on the edge of the decklid of a car, creates a downward force 103 because of the upward flow 110. Though two separate dielectric layers are shown in FIG. 10, they can be replaced by one single dielectric layer covering both plasma actuators 104 and they may also be powered by one single power source.

The plasma actuator of FIG. 1 can be placed around the front pillar (A-pillar) as shown in FIG. 7. The plasma actuator 70 reduces vortex 78 forming at or adjacent the front window 74 and the front windshield 76, thus reducing overall vehicle drag. The plasma actuator can also be placed around the side mirror 72 to reduce vortex around the side mirror, and thus overall vehicle drag.

The plasma actuator of the present technology can also be used to control boundary layer flows. FIG. 8 illustrates air 80 flowing in a direction that is generally parallel to lengths of the electrodes 10 and 14. As the air 80 flows over the plasma actuator, the plasma actuator induces an air flow 16 from the exposed electrode 10 and forms a plasma region 22. The induced air flow 16 forms vortex 82 around the plasma region 22. The intensity of the induced air flow 16 and the vortex 82 depends on a size, or strength, of the plasma region 22, which depends on the intensity of the voltage provided by the power source. The plasma region 22 also depends on the distance separating the two electrodes. The boundary layer of a flow can be controlled by positioning the plasma actuator relative to the air flow. FIG. 12 illustrates positioning the plasma actuator 122 with an induced air 126 flowing against the air 124 flowing over the plasma actuator. As the air 124 flows against the induced air 126, a flow separation region 128 is created. FIG. 13 illustrates positioning the plasma actuator 132 in such way that the induced air 136 flows in generally the same direction as incoming air flow 134.

The plasma actuator alters the characteristics of a fluid flowing over a surface and the plasma actuator of the present technology may be used for many different applications. FIG. 9 illustrates placement of a plasma actuator 94 on a wing 90 of an airplane. The plasma actuator 94 when activated will induce incoming air flow 16 to flow closer to the surface of the wing 90 and prevent early, or pre-mature occurrence of the flow separation region 92. The plasma actuator may also be placed on the edge of a propeller of a submarine and alter sonic characteristics of the submarine.

It is understood that figures are not drawn to scale and relative physical dimensions between the elements shown in the construction of a plasma actuator may be different from what is shown by different figures. It is also understood by those skilled in the art that elements shown in different figures can be combined to form new embodiments within the scope of the present technology.

It is to be appreciated that the Detailed Description section, and not the Summary and Abstract sections, is intended to be used to interpret the claims. The Summary and Abstract sections may set forth one or more but not all exemplary embodiments of the present technology as contemplated by the inventor(s), and thus, are not intended to limit the present technology and the appended claims in any way.

What is claimed is:

1. A plasma-actuator system, for controlling aerodynamics of a vehicle, comprising multiple pairs of opposing plasma actuators positioned at lateral positions on an underside of the vehicle, wherein each pair of opposing plasma actuators comprises two electrodes, and the multiple pairs comprise:
   a first pair of opposing plasma actuators positioned adjacent a left underbody strake of the vehicle, between a left fore wheel and a left aft wheel of the vehicle to, in operation of the vehicle, reduce aerodynamic drag on the vehicle by reducing air disturbance adjacent the left strake;
   a second pair of opposing plasma actuators positioned adjacent a right underbody strake of the vehicle, between a right fore wheel and a right aft wheel of the vehicle to, in operation of the vehicle, reduce aerodynamic drag on the vehicle by reducing air disturbance adjacent the right strake;
   a third pair of opposing plasma actuators positioned beneath a vehicle chassis, adjacent the left fore wheel of the vehicle to, in operation of the vehicle, reduce aerodynamic drag on the vehicle by reducing air disturbance adjacent the left fore wheel; and
   a fourth pair of opposing plasma actuators positioned beneath the vehicle chassis, adjacent the right fore wheel of the vehicle to, in operation of the vehicle, reduce aerodynamic drag on the vehicle by reducing air disturbance adjacent the right fore wheel.

2. A plasma-actuator system, for controlling aerodynamics of a vehicle, comprising:
   a first pair of opposing plasma actuators positioned at a left lateral position of the vehicle, beneath a vehicle chassis to, in operation of the vehicle, reduce aerodynamic drag on the vehicle by reducing disturbance of air flow adjacent the left lateral position; and
   a second pair of opposing plasma actuators positioned at a right lateral position, beneath the vehicle chassis to, in operation of the vehicle, reduce aerodynamic drag on the vehicle by reducing disturbance of air flow adjacent the right lateral position;
   wherein each of the plasma actuators comprises two electrodes.

3. The plasma-actuator system of claim 2, wherein:
   the first pair of opposing plasma actuators is positioned adjacent a left underbody strake of the vehicle, between a left fore wheel and a left aft wheel to, in operation of the vehicle, reduce aerodynamic drag on the vehicle by reducing air disturbance adjacent the left underbody strake; and
   the second pair of opposing plasma actuators is positioned adjacent a right underbody strake of the vehicle, between a right fore wheel and a right aft wheel to, in operation of the vehicle, reduce aerodynamic drag on the vehicle by reducing air disturbance adjacent the right underbody strake.

4. The plasma-actuator system of claim 2, wherein:
   the first pair of opposing plasma actuators is positioned adjacent a left wheel of the vehicle to, in operation of the vehicle, reduce aerodynamic drag on the vehicle by reducing air disturbance adjacent the left wheel; and
   the second pair of opposing plasma actuators is positioned adjacent a right wheel of the vehicle to, in operation of the vehicle, reduce aerodynamic drag on the vehicle by reducing air disturbance adjacent the right wheel.

5. The plasma-actuator system of claim 2, wherein:
   the first pair of opposing plasma actuators is positioned adjacent a left edge of the vehicle, between a left fore wheel and a left aft wheel to, in operation of the vehicle, reduce aerodynamic drag on the vehicle by reducing air disturbance adjacent the left edge between the left fore and left aft wheels; and
   the second pair of opposing plasma actuators is positioned adjacent a right edge of the vehicle, between a right fore wheel and a right aft wheel to, in operation of the vehicle, reduce aerodynamic drag on the vehicle by reducing air disturbance adjacent the right edge between the right fore and right aft wheels.

6. The plasma-actuator system of claim 2, wherein each of:
   the first pair of opposing plasma actuators is arranged in a first curved shape; and
   the second pair of opposing plasma actuators is arranged in a second curved shape.

7. The plasma-actuator system of claim 6, wherein:
   the first pair of opposing plasma actuators is positioned adjacent a left wheel of the vehicle to, in operation of the vehicle, reduce aerodynamic drag on the vehicle by reducing air disturbance adjacent the left wheel;
   the second pair of opposing plasma actuators is positioned adjacent a right wheel of the vehicle to, in operation of the vehicle, reduce aerodynamic drag on the vehicle by reducing air disturbance adjacent the right wheel;
   the first curved shape has a concave side facing the left wheel and a convex side facing a fore-aft center line of the vehicle; and
   the second curved shape has a concave side facing the right wheel and a convex side facing the fore-aft center line of the vehicle.

8. The plasma-actuator system of claim 2, wherein:
   the first pair of opposing plasma actuators is positioned adjacent a left edge of the vehicle between a left fore wheel and a left aft wheel to, in operation of the vehicle, reduce aerodynamic drag on the vehicle by reducing air disturbance adjacent the left edge of the vehicle;
   the second pair of opposing plasma actuators is positioned adjacent a right edge of the vehicle between a right fore wheel and a right aft wheel to, in operation of the vehicle, reduce aerodynamic drag on the vehicle by reducing air disturbance adjacent the right edge;
   the first pair of opposing plasma actuators are arranged in a first shape having a convex side facing the left edge of the vehicle and a concave side facing a fore-aft center line of the vehicle; and
   the second pair of opposing plasma actuators are arranged in a second shape having a convex side facing the right edge of the vehicle and a concave side facing the fore-aft center line of the vehicle.

9. The plasma-actuator system of claim 2, further comprising a third pair of opposing plasma actuators positioned at a rear position of the vehicle, beneath the vehicle chassis to, in operation of the vehicle, to improve vehicle stability by generating a downward air flow.

10. The plasma-actuator system of claim 2, further comprising a third pair of opposing plasma actuators positioned at a front position of the vehicle, beneath the vehicle chassis to, in operation of the vehicle, improve vehicle stability by generating a downward air flow.

11. The plasma-actuator system of claim 2, further comprising:
   a third pair of opposing plasma actuators positioned at a left front fender of the vehicle to, in operation of the vehicle, reduce aerodynamic drag on the vehicle by reducing flow separation adjacent the left front fender; and a fourth pair of opposing plasma actuators positioned at a right front fender of the vehicle to, in operation of the vehicle, reduce aerodynamic drag on the vehicle by reducing flow separation adjacent the right front fender.

12. The plasma-actuator system of claim 2, further comprising a top-side plasma actuator positioned adjacent a rear vehicle window to, in operation of the vehicle, reduce aerodynamic drag on the vehicle by reducing flow separation adjacent the rear vehicle window.

13. The plasma-actuator system of claim 2, further comprising:
a first plasma actuator positioned at a left rear edge of the vehicle to, in operation of the vehicle, improve vehicle stability; and
a second plasma actuator positioned at a right rear edge of the vehicle to, in operation of the vehicle, improve vehicle stability.

14. The plasma-actuator system of claim 13, wherein:
the first plasma actuator is configured, and arranged at the left rear edge, to generate air flow in a first direction, opposite a main direction of air flowing past the vehicle adjacent the left rear edge to induce flow separation adjacent the left rear edge; and
the second plasma actuator is configured, and arranged at the right rear edge, to generate air flow in a second direction, opposite a main direction of air flowing past the vehicle adjacent the right rear edge to induce flow separation adjacent the right rear edge.

15. The plasma-actuator system of claim 2, further comprising:
a first plasma actuator positioned at a left-side rear portion of the vehicle, spaced from a left rear edge of the vehicle to, in operation of the vehicle, improve vehicle stability; and
a second plasma actuator positioned at a right-side rear portion of the vehicle, spaced from a right rear edge of the vehicle to, in operation of the vehicle, improve vehicle stability.

16. The plasma-actuator system of claim 15, wherein:
the first plasma actuator is configured, and arranged at the left-side rear portion, to generate air flow in a first direction, opposite a main direction of air flowing past the vehicle adjacent the first plasma actuator to induce flow separation adjacent the first plasma actuator; and
the second plasma actuator is configured, and arranged at the right-side rear portion, to generate air flow in a second direction, opposite a main direction of air flowing past the vehicle adjacent the second plasma actuator to induce flow separation adjacent the second plasma actuator.

17. The plasma-actuator system of claim 2, further comprising at least two additional plasma actuators selected from a group consisting of:
a first plasma actuator positioned at a left A-pillar of the vehicle to, in operation of the vehicle, reduce vortex adjacent the left A-pillar;
a second plasma actuator positioned at a right A-pillar of the vehicle to, in operation of the vehicle, reduce vortex adjacent the right A-pillar;
a third plasma actuator positioned at a left B-pillar of the vehicle to, in operation of the vehicle, reduce vortex adjacent the left B-pillar;
a fourth plasma actuator positioned at a right B-pillar of the vehicle to, in operation of the vehicle, reduce vortex adjacent the right B-pillar;
a fifth plasma actuator positioned at a left C-pillar of the vehicle to, in operation of the vehicle, reduce vortex adjacent the left C-pillar; and
a sixth plasma actuator positioned at a right C-pillar of the vehicle to, in operation of the vehicle, reduce vortex adjacent the right C-pillar.

18. The plasma-actuator system of claim 17, wherein each plasma actuator positioned at one of the pillars extends along most of the pillar.

19. The plasma-actuator system of claim 2, further comprising:
a first plasma actuator positioned at a left mirror assembly of the vehicle to, in operation of the vehicle, control separation of a boundary layer of air flow adjacent the left mirror assembly; and
a second plasma actuator positioned at a right mirror assembly of the vehicle to, in operation of the vehicle, control separation of a boundary layer of air flow adjacent the right mirror assembly.

20. A plasma-actuator system, for controlling aerodynamics of a vehicle, comprising:
a first elongated pair of opposing plasma actuators positioned at a left lateral position of the vehicle, beneath a vehicle chassis to, in operation of the vehicle, reduce aerodynamic drag on the vehicle by reducing air disturbance adjacent the left lateral position; and
a second elongated pair of opposing plasma actuators positioned at a right lateral position, beneath the vehicle chassis to, in operation of the vehicle, reduce aerodynamic drag on the vehicle by reducing air disturbance adjacent the right lateral position;
wherein each of the plasma actuators comprises two electrodes.

* * * * *